United States Patent
Zhang et al.

(10) Patent No.: US 9,568,123 B2
(45) Date of Patent: Feb. 14, 2017

(54) BOX AND CONDUIT HANGER SUPPORT

(71) Applicants: Kai Zhang, Los Angeles, CA (US);
Saeed Nikayin, Los Angeles, CA (US);
Gilbert Loera, Los Angeles, CA (US);
Andrew Choi, Los Angeles, CA (US)

(72) Inventors: Kai Zhang, Los Angeles, CA (US);
Saeed Nikayin, Los Angeles, CA (US);
Gilbert Loera, Los Angeles, CA (US);
Andrew Choi, Los Angeles, CA (US)

( * ) Notice: Subject to any disclaimer, the term of this patent is extended or adjusted under 35 U.S.C. 154(b) by 0 days.

(21) Appl. No.: 14/176,994

(22) Filed: Feb. 10, 2014

(65) Prior Publication Data
US 2015/0226375 A1      Aug. 13, 2015

(51) Int. Cl.
*F16L 3/00*      (2006.01)
*F16L 3/08*      (2006.01)
*H02G 3/08*      (2006.01)
*H02G 3/38*      (2006.01)

(52) U.S. Cl.
CPC ......... *F16L 3/08* (2013.01); *H02G 3/081* (2013.01); *H02G 3/381* (2013.01); *Y10T 29/49826* (2015.01)

(58) Field of Classification Search
CPC ...... F16M 13/027; H02G 3/081; H02G 3/381; H02G 3/10; H02G 3/126; H02G 3/08; F16L 3/08
USPC .......................................... 248/906, 247–248
See application file for complete search history.

(56) References Cited

U.S. PATENT DOCUMENTS

| | | | | |
|---|---|---|---|---|
| 5,405,111 A | * | 4/1995 | Medlin, Jr. | H02G 3/125 248/205.1 |
| 5,484,076 A | * | 1/1996 | Petrushka | H02G 3/125 220/3.9 |
| 5,698,820 A | * | 12/1997 | Collard | H02G 3/125 174/57 |
| 7,154,040 B1 | * | 12/2006 | Tompkins | H02G 3/126 174/50 |
| 7,699,283 B2 | * | 4/2010 | Vrame | H02G 3/20 220/3.9 |
| 8,047,491 B2 | * | 11/2011 | Gutierrez | H02G 3/105 174/50 |

\* cited by examiner

*Primary Examiner* — Christopher E Garft
(74) *Attorney, Agent, or Firm* — Kirk A. Buhler; Buhler & Associates

(57) ABSTRACT

Improvements in a box and conduit hanger support that creates a unitary support bracket that allows for central mounting of an electrical junction box to said support bracket for suspended installations. Holes and slots located in extended portion of support bracket allowing for support of conduits connected to junction box using conduit clamps. In addition, bent tabs on perimeter of support bracket provide openings for a threaded rod to pass through, thus allowing for installation of support bracket in perpendicular alignment with ceiling. The features of this plate facilitate installation and maintenance of a hanging junction box, notably for applications with inadequate spacing between ceiling and floor.

8 Claims, 4 Drawing Sheets

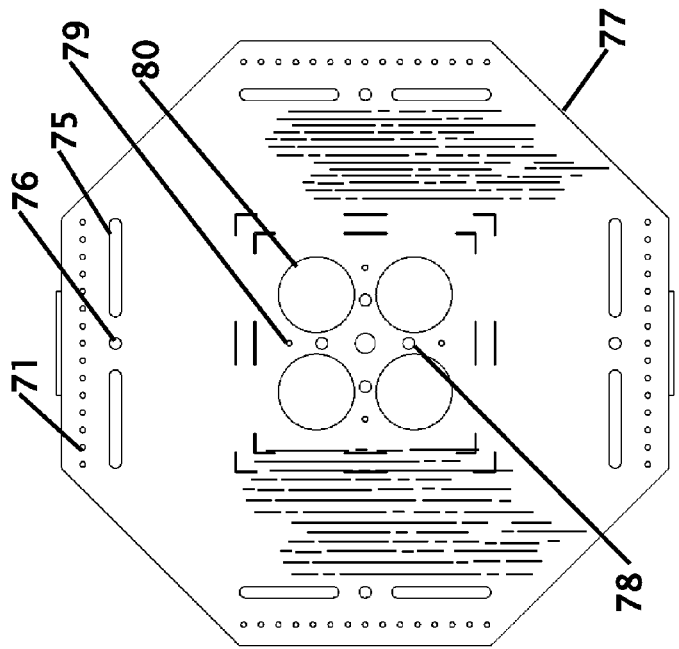
FIG. 5
FIG. 6
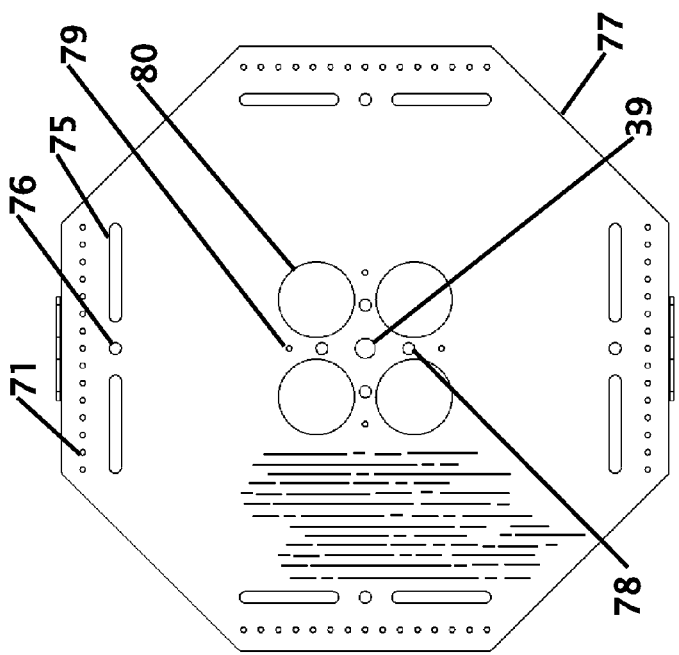
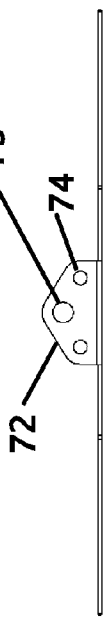
FIG. 3
FIG. 4

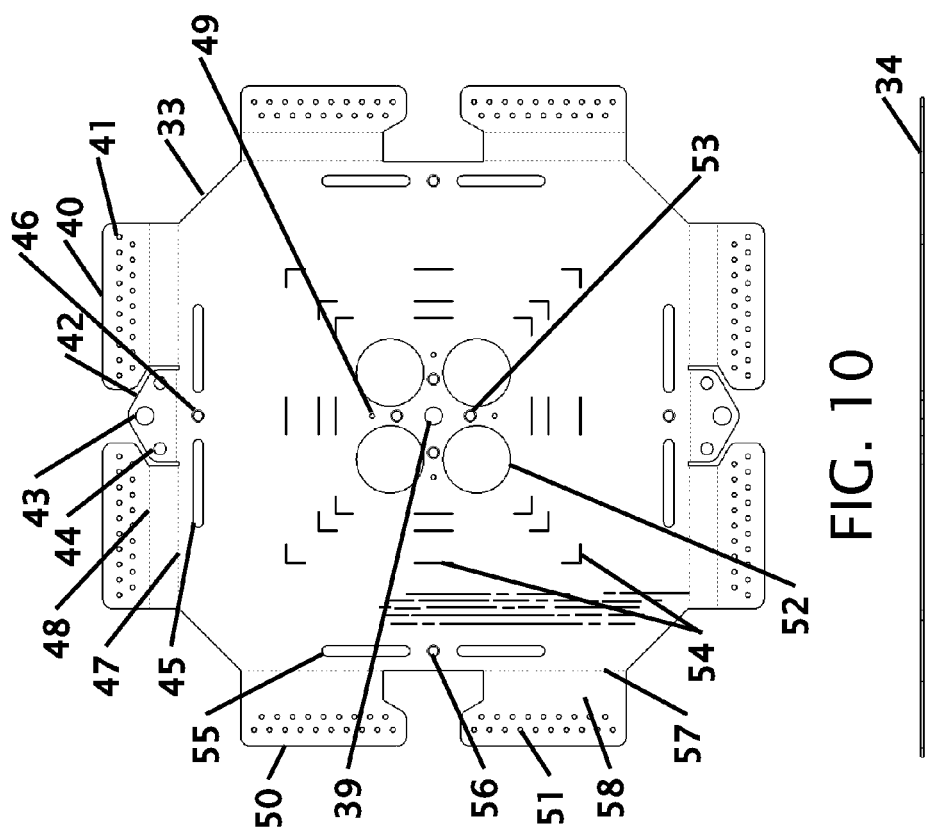
FIG. 8
FIG. 9
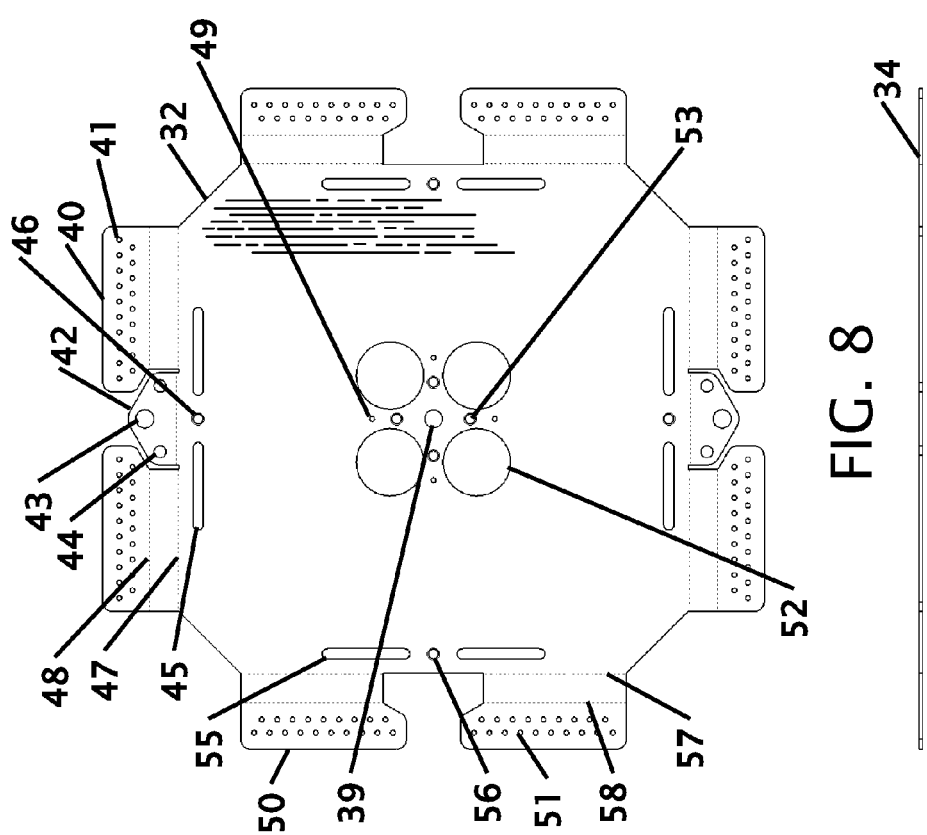
FIG. 10
FIG. 11

BOX AND CONDUIT HANGER SUPPORT

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a box and conduit hanger support. More particularly, to the hanging installation of an electrical junction box and conduit installed with a threaded rod or similar support from a ceiling.

Description of Related Art Including Information Disclosed Under 37 CFR 1.97 and 1.98

Typically when installing wiring in a building, junction boxes and conduits are used to route and protect electrical wiring. Electrical code requires both the box and the conduit be adequately mounted to a structure or support to resist movement. For routing and protecting wires on the ceiling, junction boxes are suspended using rods anchored from concrete material. The junction boxes provide access for maintenance that may be required in the future. In addition, conduits connected to junction boxes must be sufficiently supported within specified spacing as noted in Electrical Code.

There have been several methods for supporting hanging junction boxes using an arrangement of brackets, rods, and conduit clamps. One method of support uses threaded rods anchored to the ceiling to support an electrical junction box. Each conduit is then subsequently supported with additional rods. An alternative method uses brackets extending outward from the central portion of a junction box. Conduit clamps at the end of each bracket are used to support conduit connected to the junction box. Both methods require numerous parts and steps for installation, thus increasing labor costs. An alternative method requires only one rod and greatly reduces parts and steps needed for installation. Reference to this method can be seen in U.S. Pat. No. 5,883,332 issued Mar. 16, 1999 to Bobby Collard for a unitary plate that provides support for both the junction box and conduit. However, there are cases of inadequate space from the ceiling to the floor, making it difficult to provide maintenance for conventional methods. The present invention will solve this problem while still accommodating the aforementioned methods.

Other patents and or publications have been made to address these issues. Exemplary examples of patents and or publication that try to address this/these problem(s) are identified and discussed below.

U.S. Pat. No. 7,699,283 issued Apr. 20, 2010 to Peter A. Vrame et al., discloses a Support Bracket for Electrical a Box. In this patent the connecting conduit must be placed through the supporting arm. This arrangement requires fixed dimensions between the arms and conduit and does not allow for adjustment or re-positioning of the conduit or support bracket.

U.S. Publication Number 2010/0155105 was published on Jun. 24, 2010 for Cong Thanh Dinh and discloses a Cable and Box Support Plate. The plate in this publication supports flexible conduit that relies upon gravity to hold flexible conduit within slots formed in the plate. While this patent allows for connection with an electrical junction box and conduit, the location of the supports are fixed and do not allow for adjustment of the position of the conduit to the junction box.

What is needed is a box and conduit hanger support that can be mounted in a vertical or horizontal orientation and further allows for ridged conduit to join the hanger for adjustable locations and directions. The present box and conduit support found in this disclosure provides the solution.

BRIEF SUMMARY OF THE INVENTION

It is an object of the box and conduit hanger support to have markings on the base of the support bracket that provide guidelines for centrally mounting an electrical junction box in correct alignment upon the conduit hanger support. Markings are engraved or embossed onto one side of the support plate to provide alignment between the knockouts on top face of junction box and the conduit openings located on the central portion of the support bracket.

It is an object of the box and conduit hanger support to have tabs bent perpendicular to the face of the plate on opposite lateral faces of the support bracket. Holes are located on the tabs that allow for a threaded rod to pass through both tabs and suspend the support bracket in a perpendicular alignment with a ceiling. This configuration accommodates installation of hanging boxes when there is inadequate space from the ceiling and floor.

It is another object of the box and conduit hanger support to have another embodiment where the support bracket has integral flanges extending from perimeter of unitary plate. Flanges on plate correspond with lateral faces of an electrical junction box installed to support bracket. Said flanges extend in pairs as to provide support for outlying conduits connected to electrical box.

It is still another object of the box and conduit hanger support for the flanges to extend at an angle as to be in tangent relation with the top of each conduit with a plurality of pin holes on the face of each flange, thus enabling the use of one-hole straps to secure the conduit to the conduit hanger support.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 shows a top side plan view of the support bracket from FIGS. 1 and 2.

FIG. 4 shows a front side view of the support bracket from FIGS. 1 and 2.

FIG. 5 shows a bottom side plan view of the support bracket from FIGS. 1 and 2.

FIG. 6 shows a right side view of the support bracket from FIGS. 1 and 2.

FIG. 8 shows a top side plan view of the support bracket from FIG. 7.

FIG. 9 shows a right side view of the support bracket from FIG. 7.

FIG. 10 shows a bottom side plan view of the support bracket from FIG. 7.

FIG. 11 shows a front side view of the support bracket from FIG. 7.

DETAILED DESCRIPTION OF THE INVENTION

The present box and conduit hanger support is a support bracket configured as a unitary plate with a central portion for mounting an electrical junction box for hanging applications using a threaded rod, beam clamp, or similar support elements.

Figure 1:
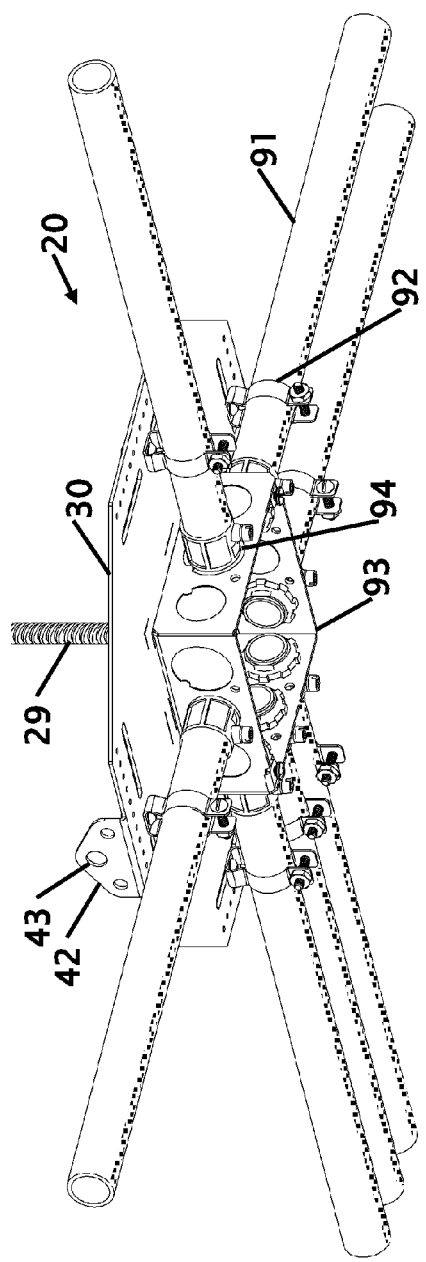
FIG. 1 shows a box and conduit hanger support according to a first preferred embodiment.
Figure 2:
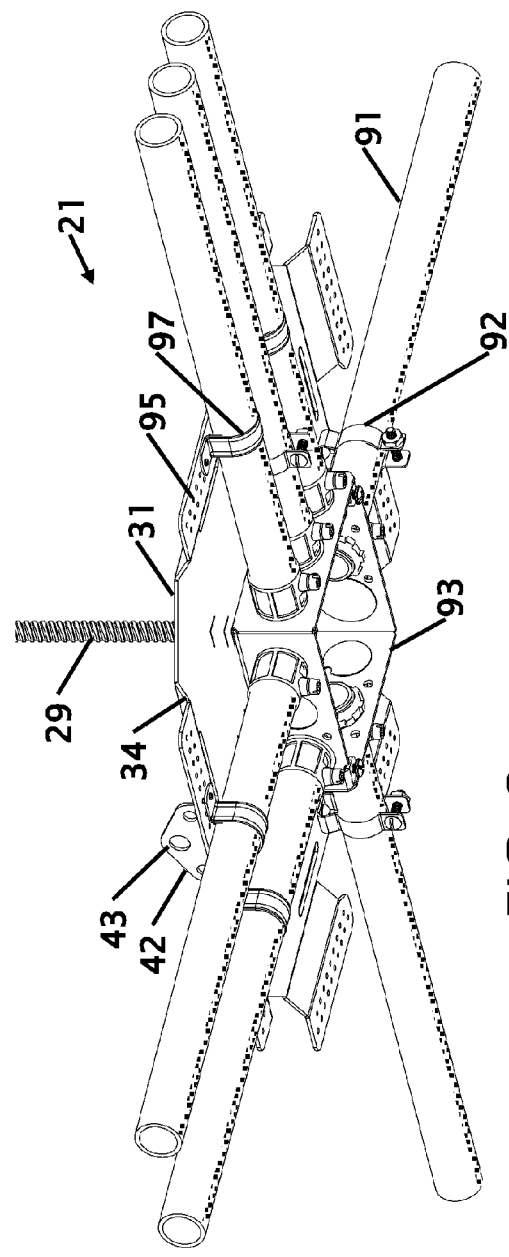
FIG. 2 shows a box and conduit hanger support from FIG. 1 with the integral flanges bent according to a second preferred embodiment.

FIG. 1 shows a box and conduit hanger support according to a first preferred embodiment and FIG. 2 shows a box and conduit hanger support from FIG. 1 with the integral flanges 34 bent according to a second preferred embodiment. Integral flanges 34 ensure that the conduit tubes are tangent to the flanges when a conduit tube is installed for use with a one hole strap below the plate 31. In the first preferred embodiment the conduit tubes are secured with conduit straps 92. In the second embodiment, one hole straps, shown with saddle clamp 97 is used to secure the conduit 91 while in tangent relation with the surface of the flanges 34.

The hanger 20/30 in FIG. 1 is shown in a flat configuration, while the hanger 21/31 in FIG. 2 has the flanges bent for a one hole installation to provide additional clearance. In both of these figures the conduit hanger support 30 or 31 is vertically supported by a down rod or screw 29 that supports the hanger from a central location on the hanger. The junction box 93 is secured to the hanger 30/31 with fasteners (not shown). The rigid conduit tubes 91 are secured to the hanger 30/31 at the junction box 93 with a coupling 94 and are also supported at the outer lip of the hanger 30/31 with a one hole saddle clamp or one hole strap 97, with a conduit hanger 92 or equivalent.

At least two tabs are shown bent perpendicular to the surface of the hanger 30/31. These tabs 42 with mounting hole 43 allow for the hanger 30/31 to be secured to the down rod 29 in a vertical arrangement as opposed to the horizontal arrangement shown in these figures. A vertical orientation is shown and described in other figures in this disclosure.

FIG. 3 shows a top side plan view of the support bracket from FIG. 1, FIG. 4 shows a front side view of the support bracket from FIG. 1, FIG. 5 shows a bottom side plan view of the support bracket from FIG. 1 and FIG. 6 shows a right side view of the support bracket from FIG. 1. This bracket is similar to the bracket previously shown and described. One major difference is that the eight flanges on the outside of the bracket field 77 have been removed.

The central hole 39 provides a mounting location for the down rod to attach the support bracket to a ceiling. Around the central hole 39 four openings 80 allow for conduit to pass through the support bracket 77 and into a secure electrical junction box. The holes 80 are sufficiently sized to allow for clearance of a connector for the conduit to the junction box openings. Additional holes 78 and 79 allow for mounting options and attachment of an electrical junction box. On four sides of the octagon are pluralities of holes 71 that provide a number of different fastening locations for securing the support clamps for conduit. The diameter of the holes 71 is sized for typical sheet metal screws that are used for electrical conduit. In addition to the mounting holes 71 a series of slots 75 allow for adjustable positioning of securing clamps for conduit tubes. These slots 75 allow the conduit clamps to slide laterally to obtain an optimal clamped location. An alignment/mounting hole 76 allows for parallel alignment and securing of conduit.

The bent tab 72 for vertical mounting of the bracket is shown in this group of figures. These two tabs 72 allow the support bracket 77 to be mounted in a vertical arrangement. The tabs 72 have holes 73, sized similar to hole 39, for mounting to a down rod. The tabs 72 further have holes 74 for mounting additional hardware for securing, safety cables, or anti-rotation devices.

Figure 7:
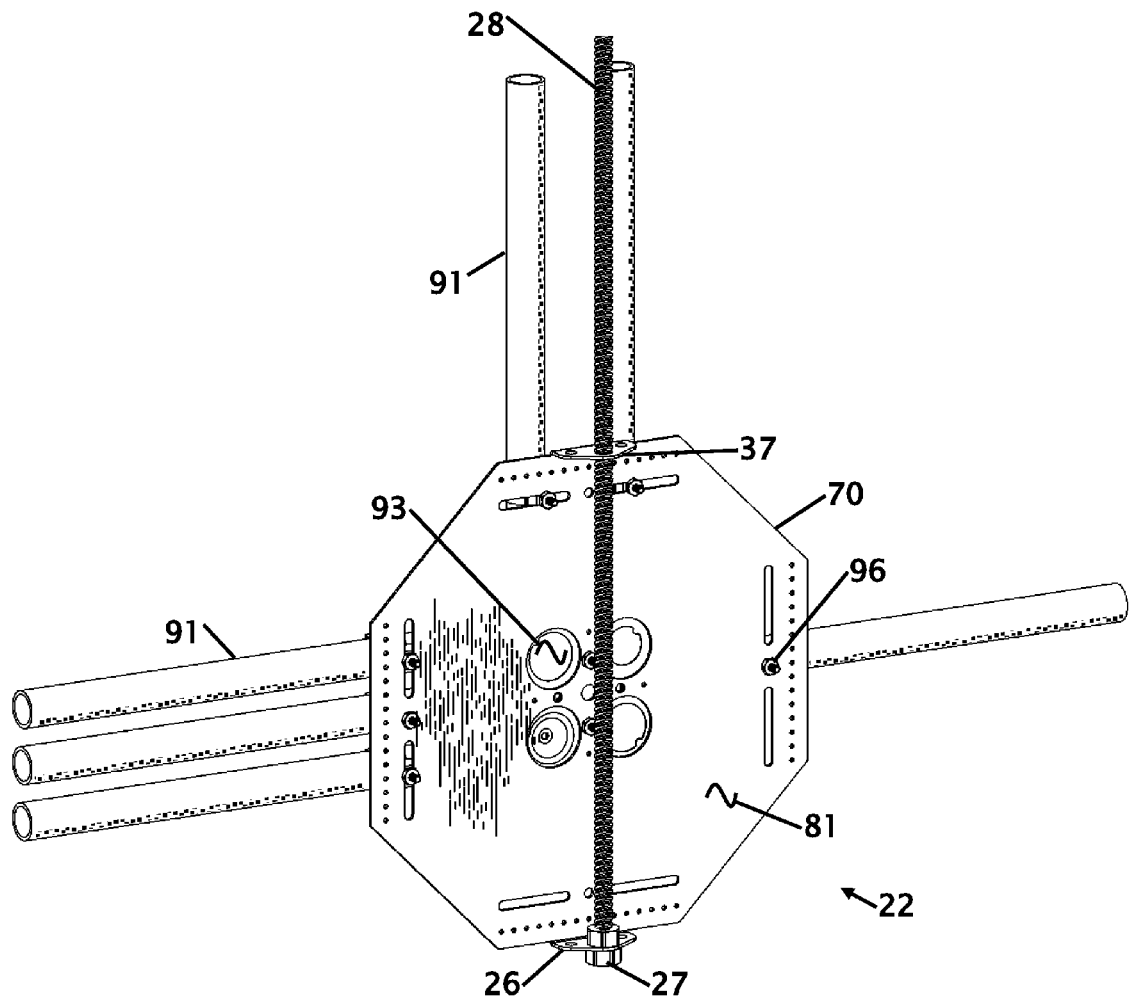
FIG. 7 shows a perspective view of a first preferred embodiment of a support bracket shown in a vertical installation application.

FIG. 7 shows a perspective view of a first preferred embodiment of a support bracket shown in a vertical installation application. The support bracket 70 has integral tabs 26 extending from perimeter of unitary plate 81. Tab 26 on plate 81 correspond with lateral faces of an electrical junction box 93 installed to support bracket 70.

Multiple conduit tubes 91 are shown extending parallel to the surface of the plate 81. Securing nuts 96 or equivalent hardware secured the conduit tubes to the support plate 81. The securing down pipe, rod or screw 28 is shown passing through an upper tab 37, extending parallel to the back of the supporting bracket 70 and secured with a nut 27 or equivalent hardware to the lower tab 26.

FIG. 8 shows a top side plan view of the support bracket 32 from FIG. 2, FIG. 9 shows a right side view of the support bracket 32 from FIG. 2, FIG. 10 shows a bottom side plan view of the support bracket 33 from FIG. 2 and FIG. 11 shows a front side view of the support bracket 32 from FIG. 2. A central hole 39 provides a mounting location for the down rod to attach the support bracket 32 to a ceiling. Around the central hole 39 four openings 52 allow for conduit to pass through the support bracket 32 and into a secure electrical junction box. The holes 52 are sufficiently sized to allow for clearance of a connector for the conduit to the junction box openings. Alignment holes 53 and mounting holes 49 for sheet metal fasteners are provided to secure an electrical junction box. A series of impressions, marking, or embossed images 54 provide a location for centering an electrical junction box onto the support bracket 32.

From the central area of the support bracket 32 eight integral flanges 40 exist. Each of the eight flanges 40 bend through two sets of bend lines 47/57 and 48/58 to ensure that the integral flanges 40/50 etc. are essentially parallel to the central field of the support bracket 32 helps to make sure that the flanges allow for the use of one hole straps with the conduit. The eight flanges 40/50 etc. have a plurality of holes 41 that provide a number of different fastening locations for securing the one hole strap for conduit. The diameter of the holes 41/51 is sized for typical sheet metal screws that are used for electrical conduit. In addition to the mounting holes 41/51 a series of slots 45 and 55 allow for adjustable positioning of securing clamps for conduit tubes. These slots 45, 55 allow the conduit clamps to slide laterally to obtain an optimal clamped location.

At least two other tabs 42 are bendable to allow the support bracket 32 to be mounted in a vertical arrangement. The tabs 42 have holes 43, sized similar to hole 39, for mounting to a down rod. The tabs 42 further have holes 44 for mounting additional hardware for securing, safety cables, or anti-rotation devices. Alignment holes 46/56 provide additional mounting/securing locations. The alignment hole 46 further can help to stabilize the support bracket 32 when placed in a vertical orientation by providing a location for clamps to mount from the support bracket 32 to the down pole, rod or screw.

Notably, markings 54 on the base of the support bracket 32/33 provide guidelines for centrally mounting an electrical junction box in correct alignment. The markings 54 are engraved onto one side of the support plate to provide alignment between knockouts on top face of junction box and conduit openings located on central portion of support bracket 32/33. Notably, the support bracket 32/33 shows has tabs 42 that can be bent perpendicular to face of the plate on opposite lateral faces of said support bracket 32/33. Holes 43 on tabs allow for a threaded rod to pass through both tabs and suspend the support bracket 32/33 in perpendicular alignment with ceiling. This configuration accommodates installation of hanging boxes when there is inadequate space from the ceiling and floor.

Thus, specific embodiments of a box and conduit hanger support have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A bracket system providing support for an electrical junction box, and one or more attached conduits, comprising:

a four sided unitary support bracket having a central portion with a plurality of holes that allow for vertical support of an electrical junction box;

said four sided unitary support bracket further having four outwardly extending portions with integral flanges that correspond to four lateral faces of a junction box;

said integral flanges being split to define split outwardly extending integral flanges;

said split outwardly extending integral flanges each comprising of a plurality of holes for support of at least one strap to secure a conduit to each of said four outwardly extending portions with integral flanges;

said four sided unitary support bracket includes elongated slots for adjustable support of at least one conduit within said adjustable elongated slots, and at least two of said split outwardly extending integral flanges being separated by a separate tab.

2. The bracket system providing support according to claim 1 wherein said at least one strap is a one-hole strap.

3. The bracket system providing support according to claim 1 wherein said at least one conduit is rigid conduit.

4. The bracket system providing support according to claim 1 wherein said four sided unitary support bracket includes mounting elements that mount said four sided unitary support bracket in an orientation suspended parallel and vertical with a ceiling.

5. The bracket system providing support according to claim 1 wherein said split outwardly extending integral flanges are bent through two sets of bend lines that offset said four sided unitary support bracket from said split outwardly extending integral flanges.

6. The bracket system providing support according to claim 5 wherein said two sets of bend lines exist on four sides of said four sided unitary support bracket.

7. The bracket system providing support according to claim 1 wherein said separate tabs are bent perpendicular to said central portion and said split outwardly extending integral flanges are bent to an opposite side of said central portion.

8. The bracket system providing support according to claim 7 wherein said separate tabs and said split outwardly extending integral flanges are bent along a common bend axis of said separate tabs and said integral flanges.

\* \* \* \* \*